Feb. 15, 1966
W. B. WILKINS
3,235,430
METHOD AND APPARATUS FOR FORMING CUT PREFORMS
FROM WOUND LAMINATE MATERIAL
Filed June 4, 1963
3 Sheets-Sheet 1
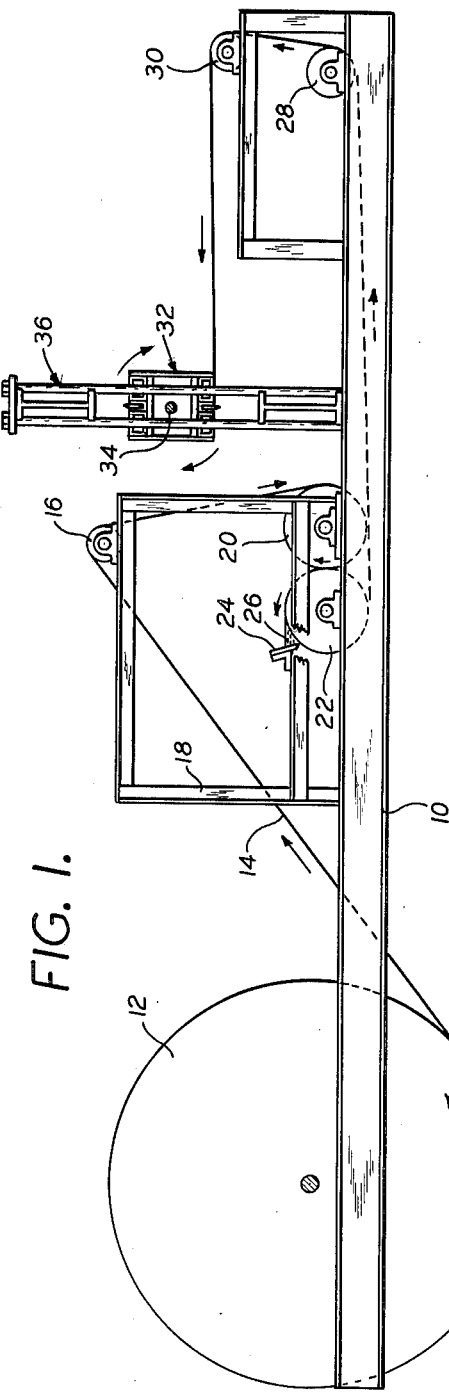
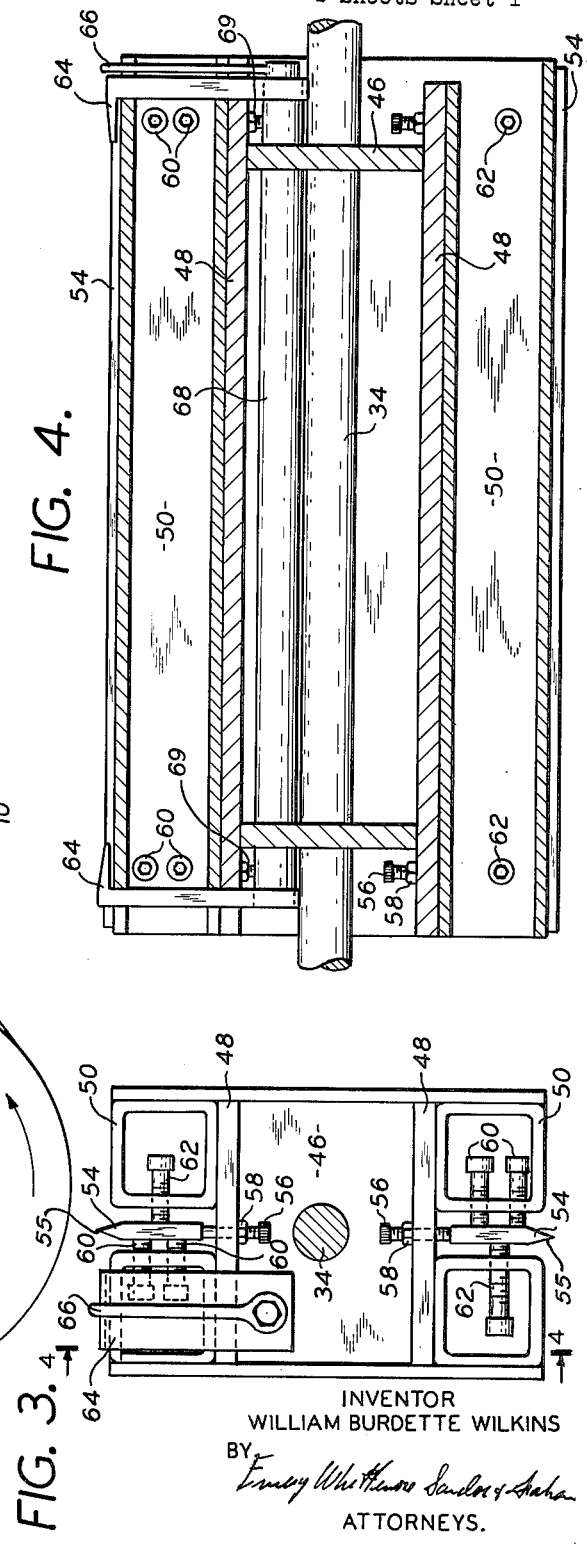
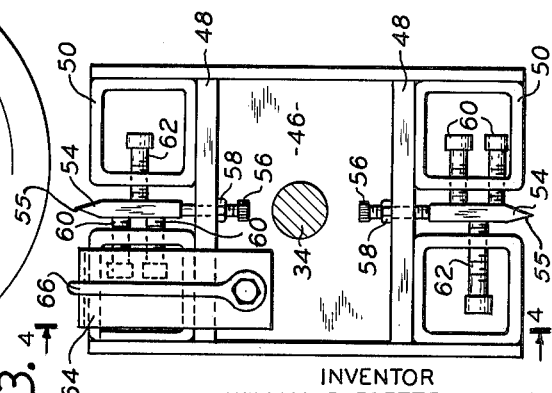
INVENTOR
WILLIAM BURDETTE WILKINS
BY
ATTORNEYS.

INVENTOR
WILLIAM BURDETTE WILKINS

Feb. 15, 1966   W. B. WILKINS   3,235,430
METHOD AND APPARATUS FOR FORMING CUT PREFORMS
FROM WOUND LAMINATE MATERIAL
Filed June 4, 1963   3 Sheets-Sheet 3

INVENTOR
WILLIAM BURDETTE WILKINS
BY
ATTORNEYS.

United States Patent Office 3,235,430
Patented Feb. 15, 1966

3,235,430
METHOD AND APPARATUS FOR FORMING CUT PREFORMS FROM WOUND LAMINATE MATERIAL
William Burdette Wilkins, Roxboro, N.C., assignor to Reinforced Plastic Container Corporation, Roxboro, N.C.
Filed June 4, 1963, Ser. No. 285,375
12 Claims. (Cl. 156—193)

This invention relates generally to the laminating art and, more particularly, relates to an improved method and apparatus for fabricating structural preforms of bodies, such as open ended crate bodies, from lamination stock available in continuous rolls, such as paper.

Fabrication of many structures, such as small crates, from a plurality of paper laminations bonded together has been found desirable because of the relatively low cost of paper coupled with the structural capabilities of such material when assembled.

However, in many applications, handling costs have overcome the initial material cost advantages.

For example, cutting paper to the desired configuration, applying a bonding resin thereto, stacking the lamination in a mold for curing, and trimming of the formed body is too expensive in terms of handling costs, rendering the crate noncompetitive with wood crates, etc.

Since the paper is available in long coiled lengths, it is advantageous to use continuous lengths for processing.

Thus, for example, it has been found advantageous to form more than one body unit at a time. For example, when constructing crate bodies, it had been thought advantageous to provide a mandrel, the outer dimensions of which correspond to the desired internal dimensions of two bodies positioned in mirror image fashion. The paper can then be coated or impregnated with a bonding resin and wrapped over the mandrel in a continuous winding to the desired lamination thickness. It is then, of course, necessary to divide the continuous laminated surface to form two separated preforms of the body portions which can be molded to cure the resin.

For this purpose, the art has used saws and other types of abrasion tool. However, this increases the cost and difficulty of manufacture since such saws will, of course, throw off a considerable amount of dust and debris. In addition, the scarf material is wasted. Further, it is very difficult to obtain the desired clean edges by such processing.

Although shears have been proposed for such applications, it has been found that the usual type of shear can not handle resin coated paper stock to give the desired clean-cut edge and without displacing the laminations.

Finally, unless the separation can be made on the mandrel, it is necessary to construct removable mandrels, which is expensive, both as to initial cost and as to manufacturing cost.

It is, therefore, the primary object of this invention to provide an improved method and apparatus for forming preforms of related bodies by winding a plurality of laminations to which a bonding resin is applied on a mandrel and separating the laminations along the junction between the related bodies.

In accordance with this object, there is provided, in a preferred embodiment of this invention, a mandrel, the dimensions of which correspond to the internal dimensions of two crates placed in mirror image fashion. Knives are carried by the mandrel with the edges thereof protruding above the mandrel surface and extending along the length of the mandrel at the desired parting line between the crate bodies. The lamination stock, such as paper stock, to which a bonding resin, such as urea resin, has been applied, is wrapped about the mandrel over the upstanding knife edge. The mandrel is rotated, quickly building up the lamination thickness to that desired. The knife edge protrusion upwardly from the mandrel surface must at least equal the thickness of the laminations wound thereon. Upon completion of wrapping the laminations on the mandrel, a parting roller is rolled along the laminations over the knife edge. The parting roller is urged into contact with the knife edge thereby to part the laminations as it rolls thereover. By parting the laminations in this manner, the laminations are cut to the exact lengths, automatically compensating for the change of sheet length as the laminations build up. In order to prevent lateral displacement of the laminations and to prevent contact between roller and knife edge, a strip of hard flexible material is applied over the laminations, under the roller. One edge of this strip is fixedly secured in position so that as the roller rolls thereover, no displacement force will be transmitted to the lamination stock. The separated preforms can then be molded to cure the resin, forming the crate bodies.

Having briefly described this invention, it will be described in greater detail along with other objects and advantages in the following portions of the specification, which may best be understood by reference to the accompanying drawings, of which:

FIG. 1 is an elevation view of a wrapping station in accordance with the present invention;

FIG. 3 is a partially sectioned view of the mandrel shown in FIG. 2;

FIG. 4 is a sectioned view taken along lines 4—4 of FIG. 3;

Figure 2:
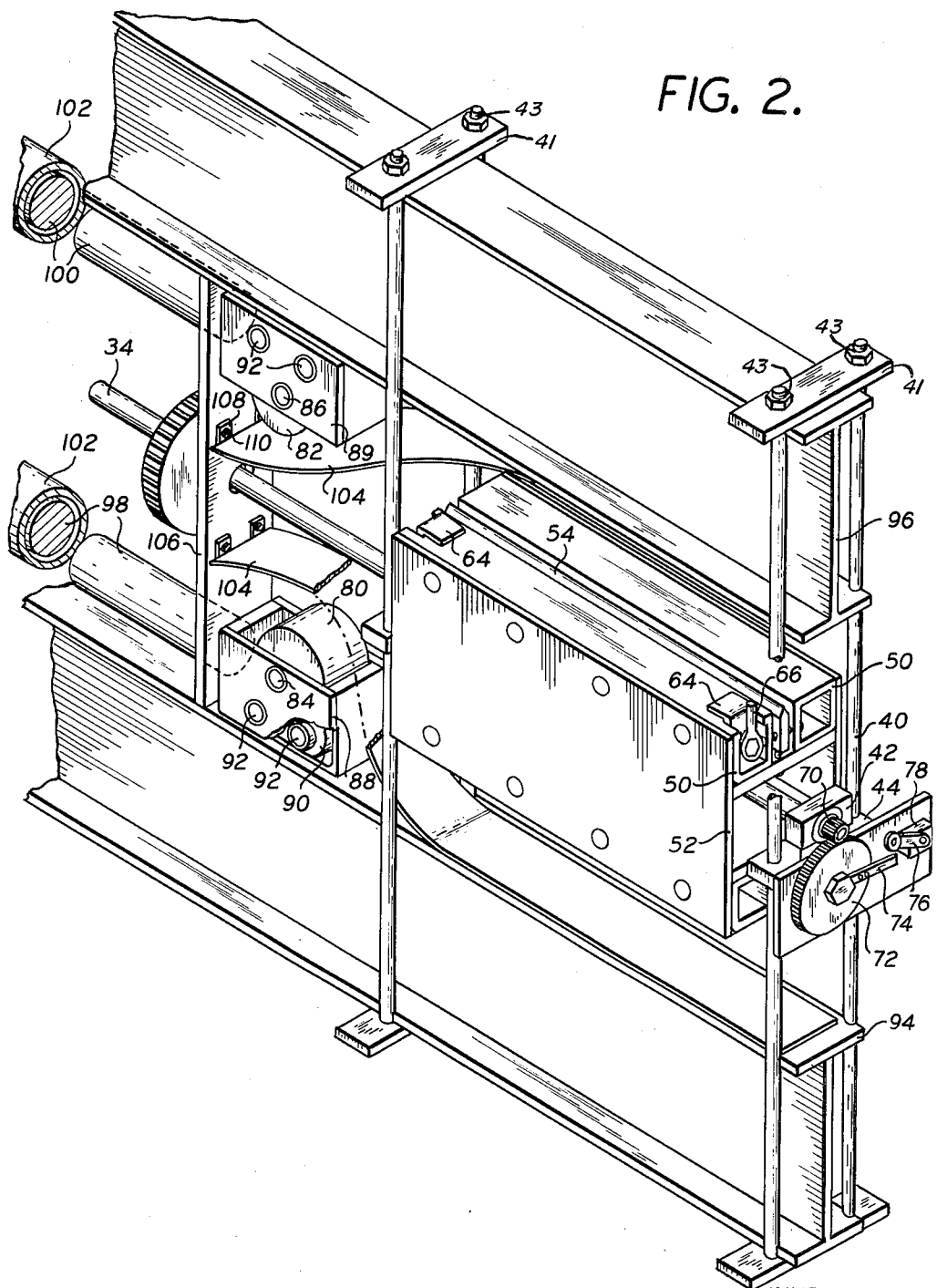
FIG. 2 is a perspective view of a portion of the apparatus shown in FIG. 1 showing the mandrel station including the mandrel and cut off rollers.

In FIG. 1, there is shown a wrapping station to a scale which precludes showing of detail of mandrel construction and the like, but which is useful in explaining the general method and apparatus of the invention. The wrapping station comprises a main frame 10 on which is rotatably mounted a storage roll 12 of lamination stock 14, such as kraft paper.

The stock 14 is drawn over an idler roll 16 on the top of frame 18 and around rollers 20, 22 to tension the stock. An applicator consisting of a doctor blade 24 and a resin puddle 26 is used to coat the stock with the bonding resin, such as a thermosetting urea resin. The doctor blade is preferably adjustably mounted on the frame to facilitate adjustment of the resin thickness applied to the stock. In most applications, a very thin resin coating is sufficient and, in such cases, the doctor blade may be made of thin sheet stock urged against the paper as it is carried on the surface of applicator roll 22, the flexibility of the blade being sufficient to take up stock thickness variation. The resin coated stock is then passed over rollers 28, 30 and the end of the sheet clamped on a mandrel 32 bound about shaft 34 which is rotatably mounted in an upright frame 36.

The mandrel dimensions correspond to the internal dimensions of two crate bodies placed in mirror image fashion. Thus, as shown, the mandrel is of rectangular configuration to form two U-shaped crate bodies. The mandrel is provided with knife edges protruding above the surface of the mandrel and extending along the mandrel at the desired boundary between the bodies formed on the single mandrel. The mandrel is then rotated to build up the lamination thickness to the desired wall thickness rapidly, which laminations are built up over the knife edges. The bodies are then separated along the knife edges as will be explained in detail hereinafter and the bodies removed from the mandrel. The laminations forming each body preform can be removed as an assembly for insertion in a heated mold capable of providing the necessary heat and pressure to bond the laminations together to form the crate body. The cut edge is then reclamped to the mandrel and the operation repeated.

The details of the mandrel construction and operation are best shown in FIGS. 2–6, to which reference is now made.

The mandrel 32 is bound about shaft 34 which is rotatably mounted in bearing blocks 42 carried in the flange 44 on vertical frame members 40. The mandrel is formed from central transverse webs 46 affixed to the shaft to the ends of which are fixedly secured longitudinally extending frame members or plates 48. Longitudinally extending hollow core box beams 50 are mounted on each frame member 48. Side walls 52 are secured to beams 50 thereby to form the mandrel with a generally rectangular configuration.

Between the hollow beams 50, space is provided for mounting of the knife blades 54. To mount each knife rigidly but adjustably in position, there are provided several vertically extending screws 56 to contact the base of the knife. By rotation of this screw, the projection of the knife above the surface of the mandrel can be adjustably controlled and, when in the desired position, nuts 58 can be locked to hold such positioning. Transverse positioning and clamping of the knife blade is provided by screws 60 extending through the wall of one hollow beam and screws 62, extending through the wall of the other hollow beam.

In order to clamp the end of the paper to the mandrel for starting of lamination buildup thereon, clamps 64 are provided on each end of the mandrel, which clamps can be drawn into contact with the mandrel surface by rotation of lever 66 which closes the clamp through the operation of the eccentric shaft 68 riding on stops 69.

When the end of the paper strip is clamped to the mandrel, the mandrel is rotatably driven as, for example, by an electric motor to rotate the mandrel thereby to build up the desired lamination thickness of the paper laminations wound thereon. When the lamination thickness is predetermined for a series of crates or boxes, I have found it advantageous to mount a spur gear 70 on the end of the shaft, the teeth of which engage gear 72. A trip lever 74 is mounted on gear 72 to trip the arm 76 of an electric switch 78. By adjusting the teeth on gear 72 so as to bear the same ratio to the number of teeth on gear 70 as the desired number of laminations, the motor rotating the mandrel can be energized and it will drive the mandrel through the requisite number of revolutions before the arm 74 trips switch 78 to remove power from the motor, stopping the mandrel when the knives are in vertical alignment. To start the mandrel, a temporary over-ride for switch 78 may be provided. Of course, manual control of the rotation can be used, the choice being dependent upon the production run quantities anticipated.

In order to separate the continuous laminations into the desired separated U-shaped crate box, parting rollers 80 and 82 are provided respectively on the bottom and top of the mandrel. Parting rollers 80, 82 are mounted on freely floating shafts 84, 86 respectively, carried in trucks 88, 89 respectively. Each truck is provided with pressure rollers 90 mounted on shafts 92. The pressure rollers support the parting roller transferring the cutting load to beams 94, 96. To define the path of movement of the trucks, the rigid I-beams 94, 96 are respectively mounted within frame work 36. The frame members 40 cooperate through strap 41 and nuts 43 to provide means for positional adjustment of beams 94, 96. To drive truck 88 along frame 94, a pneumatic ram 102 is provided and the truck 88 coupled to the piston rod 98 thereof. Similarly, ram 102 is provided to drive truck 89 by means of the piston rod 100 coupled thereto. A flexible strip 104 is positioned between each roller and the mandrel, which strip is fixedly secured to the frame by means of a strut 106, to which the end of the strip 104 is secured by angle piece 108 and nuts 110. The strips may, for example, be phenolic impregnated pressure molded material such as Micarta, the trademark designation for the material sold by Westinghouse. Alternatively, the various phenolic impregnated pressure molded materials sold as fiberboard may be used.

Figure 5:
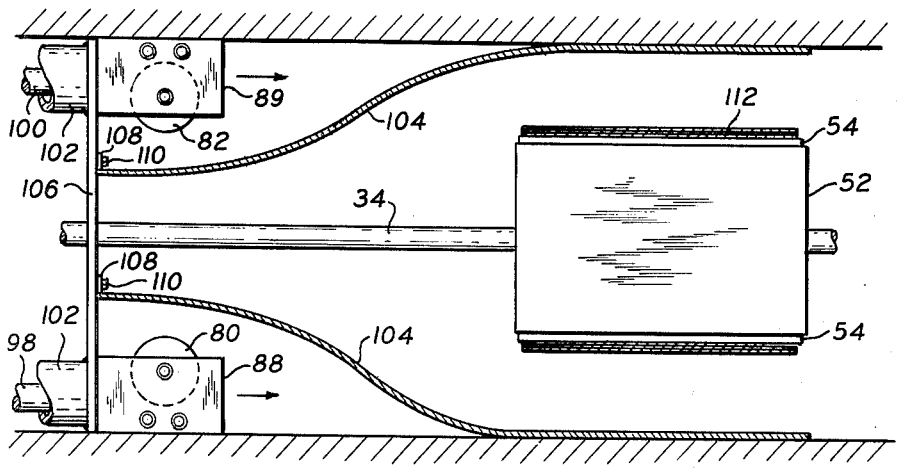
FIG. 5 is an elevation view of a portion of the mandrel station showing a wrapped mandrel.
Figure 6:
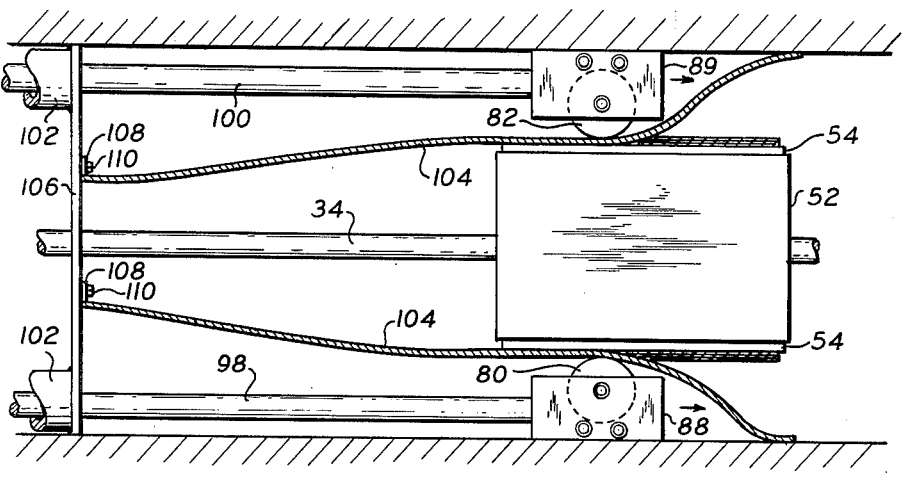
FIG. 6 is an elevation view of the apparatus shown in FIG. 5 showing the rollers in advanced position.
Figure 7:
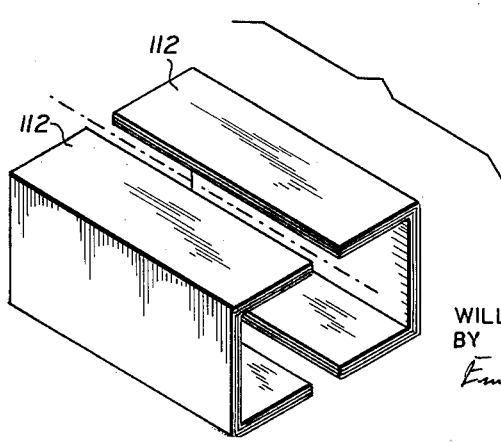
FIG. 7 is a perspective view of the formed bodies after separation and removal from the mandrel.

The strips 104 are separated from the mandrel so as to enable rotation of the mandrel during buildup of the laminations as, for example, by clamping the upper strip to the I-beam 96. When the required number of laminations have been built up on the mandrel, it is stopped with the knives in the vertical position as shown in FIG. 5 and the pneumatic cylinders actuated to drive the parting rollers as shown in FIG. 6. As specifically shown in FIG. 6, the roller is so positioned as to urge the strip 104 into engagement with the edge 55 of knife 54. As each truck 88, 89 is forced to traverse the mandrel, the rollers 80, 82 will force the strips 104 and the laminations into the knife edge and the laminations will be parted in a clean cut to form the U-shaped crate preforms 112 which are identical in outline configuration. This preform can then be directly inserted into a mold for curing of the resin. The freely rotatably roller coupled with the strip 104, anchored at one end, prevents exertion of a displacing force on the laminations. The resin also holds the position of the laminations in many applications.

As the parting roller traverses the knife edge, the sheets are parted without creation of debris. No provision need be made for scarfing waste since no material is removed. Although completely unanticipated, the mandrel can be used repeatedly and sheets which are wet with resin can be parted repeatedly without cleaning the knife blade between cuts.

It is desirable to form the knife blade with an edge bevelled equally on each side of the knife. If the knife blade is formed with a bevel on one side, during parting of walls formed from many laminations, the laminations will tend to pile up upon the side of the bevel, sometimes exerting sufficient force as to rip the outer lamination. When bevelled on each side, substantial thicknesses of laminated material can be cut without ripping of the outer lamination. For example, with a bevel of sharp pitch shown, a wall formed from laminations of kraft paper impregnated with urea resin built up to ¼-in. in thickness is easily cut in manufacture. If the number of laminations are increased, it may be advisable to reduce the slope of the bevel forming the knife edge.

Since the laminations are wrapped over the protruding knife edge, the edge of the knife should protrude only by that amount necessary to cut through the desired lamination thickness. The knife blade can extend above the surface by additional amounts without influencing the effectiveness of parting. However, this causes greater separation of the laminations from the surfaces of the mandrel during wrapping which adversely affects ease of control over preform size.

In this manner, therefore, there is provided an improved method and apparatus for the fabrication of crate structures formed from laminated stock such as paper. Since the laminations are wound in a continuous fashion on mandrel, the stock can be withdrawn from a storage roll and applied thereto rapidly and in a manner requiring very little handling. The speed of wrapping ensures that such factors as resin thickness and resin loading of the paper can be accurately controlled. The preform is then separated by operation of the rollers which is very rapid. Therefore, the preforms can be removed from the mandrel without disturbing the mandrel mounting or positioning. The apparatus is, thus, ready for cycling.

This invention may be variously modified and embodied within the scope of the subjoined claims.

What is claimed is:

1. Apparatus for forming two related preforms from a plurality of laminations to the surfaces of which a bonding resin is applied comprising a mandrel, at least one knife extending upwardly from the surface of said mandrel and extending along the length thereof, means for wrapping the laminations in a continuous length around said mandrel and over the knife thereon, a parting roller, and means for moving the parting roller along the laminations over said knife under pressure urging the roller surface into engagement with the edge of said knife to part said laminations along the knife.

2. Apparatus in accordance with claim 1 in which two knife edges are positioned on respective sides of the mandrel and in which a parting roller is provided for movement across each knife edge.

3. Apparatus in accordance with claim 1 which includes means for applying a coat of resin to the lamination material and which includes clamp means on said mandrel for clamping the end of said lamination to said mandrel.

4. Apparatus in accordance with claim 3 in which said resin applicator means comprises a doctor blade positioned adjacent an applicator roller.

5. Apparatus in accordance with claim 2 which includes a strip of hard flexible composition board positioned between each knife and its associated parting roller, one end of each of said strips being fixedly secured to prevent displacement of said strip over said laminations by said roller, said roller being positioned to urge said strip into contact with said knife.

6. In combination, a rotatably mounted mandrel, said mandrel having a rectangular cross section defined by side walls, a top and bottom wall, a knife blade positioned respectively in said top and said bottom wall, each of said blades extending longitudinally of said mandrel and mounted with the blade thereof protruding above the respective surface of said mandrel, means for rotating said mandrel, means for wrapping said mandrel with a plurality of laminations of lamination stock to which a bonding resin has been applied during rotation of said mandrel, a first and second beam positioned on opposite sides of said mandrel, a first and second parting roller, each of said rollers being rotatably mounted in a truck, and means for driving each of said trucks along a respective beam with said parting roller urged towards said knife blade to part the laminations along the longitudinally extending blade.

7. The combination in accordance with claim 6 which includes a first and second strip of flexible hard material respectively positioned between said first and second rollers and respective blade.

8. The combination in accordance with claim 6 in which said trucks include wheels for rotative engagement with the respective beam.

9. The combination in accordance with claim 6 in which each of said knife blades are adjustably positioned in said mandrel.

10. The combination in accordance with claim 6 which includes clamp means on said mandrel to clamp the end of said lamination stock to said mandrel.

11. The method of forming laminated bodies from continuous stock on a mandrel having a longitudinally extending knife protruding from opposed surfaces thereof, which comprises spreading a bonding resin on said stock, winding stock in a continuous winding on said mandrel over said protruding knives, and rolling parting rollers along said knives to part the laminations along each of said knives.

12. The method in accordance with claim 11 in which a hard flexible strip is aligned with each of said knives and in which said parting roller is driven over said strip to part said laminations along each of said knives.

References Cited by the Examiner

UNITED STATES PATENTS

| 1,054,143 | 2/1913 | Plost | 83—178 XR |
| 2,454,074 | 11/1948 | Marc | 156–193 XR |
| 2,757,728 | 8/1956 | DeLisi et al. | 83–510 XR |
| 2,772,736 | 12/1956 | Campbell | 83–510 |

EARL M. BERGERT, *Primary Examiner.*